Patented Mar. 25, 1930

1,752,187

UNITED STATES PATENT OFFICE

FERNAND EMILE LEFEBVRE, OF CLICHY, FRANCE, ASSIGNOR TO L'OXHYDRIQUE FRANCAISE, OF MALAKOFF, SEINE, FRANCE

APPARATUS FOR THE PRODUCTION OF HYDROGEN

Application filed July 16, 1928, Serial No. 292,985, and in France July 18, 1927.

The invention relates to apparatus for the production of hydrogen by means of the reaction of a soda solution or of a potash solution upon silicon or ferro-silicon, this reaction being:

$$Si + 2(NaOH) + H_2O = Na_2SiO_3 + 2H_2$$

In the known processes, the operation is carried out at atmospheric pressure and in aqueous medium, substantially at 100° C.; the reaction may be regulated by varying the delivery of the ferro-silicon distributer which feeds a hydrogen generator provided with powerful stirring means.

The water vapor which is drawn off by the gas is condensed by means of scrubbers of large size which use a great amount of cold water, this being also utilized for cooling the mass.

However, the above reaction may be satisfactorily carried out only with great difficulty and this can be done only by very skilled people. As a matter of fact if the temperature rises the reaction becomes too active and the water is violently vaporized; on the other hand water must be injected into the generator, so as to moderate the reaction, to obviate serious accidents and at the same time to obviate drying the whole mass, but if the water injected is in excess, the reaction is almost stopped; although further amounts of silicon are then added to re-start the reaction, the latter remains stopped for a certain time, then resumes abruptly with a considerable disengagement of hydrogen, and then stops again, etc., thus giving rise to violent jerks. But if the amount of injected water is not sufficient, the reaction becomes more and more active and serious accidents may happen; the mass becomes viscous and thick and can no more be discharged out of the apparatus.

Further, the reaction takes place in a foaming medium which is in constant motion, so that all indications of the level of the mass in the generator is rendered impossible.

The object of the invention is to provide an apparatus by which these serious drawbacks are eliminated while simplifying the operation. Another object of the invention is to provide an apparatus comprising a closed vessel wherein the operation may be carried out under pressure, thus affording the direct production of hydrogen under pressure.

A further object is to devise an apparatus provided with a distributer adapted to supply the ferro-silicon at will and under control of the operator; the mass is stirred by the rocking motion and vibrations which are imparted to the generator, and in certain cases the stirring action may be increased by means of a suitable chain suspended within the generator.

The ferro-silicon distributer may be freely suspended within the apparatus, or it may be secured to the removable closing plug thereof. This distributer may be perforated on a suitable part thereof, or may be provided with suitable ports; the lower end of the distributer may be more or less closed by means of an extension which is pivoted or not to the distributer.

The delivery of ferro-silicon may thus be varied at will, either due to the more or less jerked motion which is imparted to the apparatus by the operator, or by means of a suitable feeding screw.

The appended drawing shows by way of example an embodiment of the apparatus according to the invention.

Figure 1:
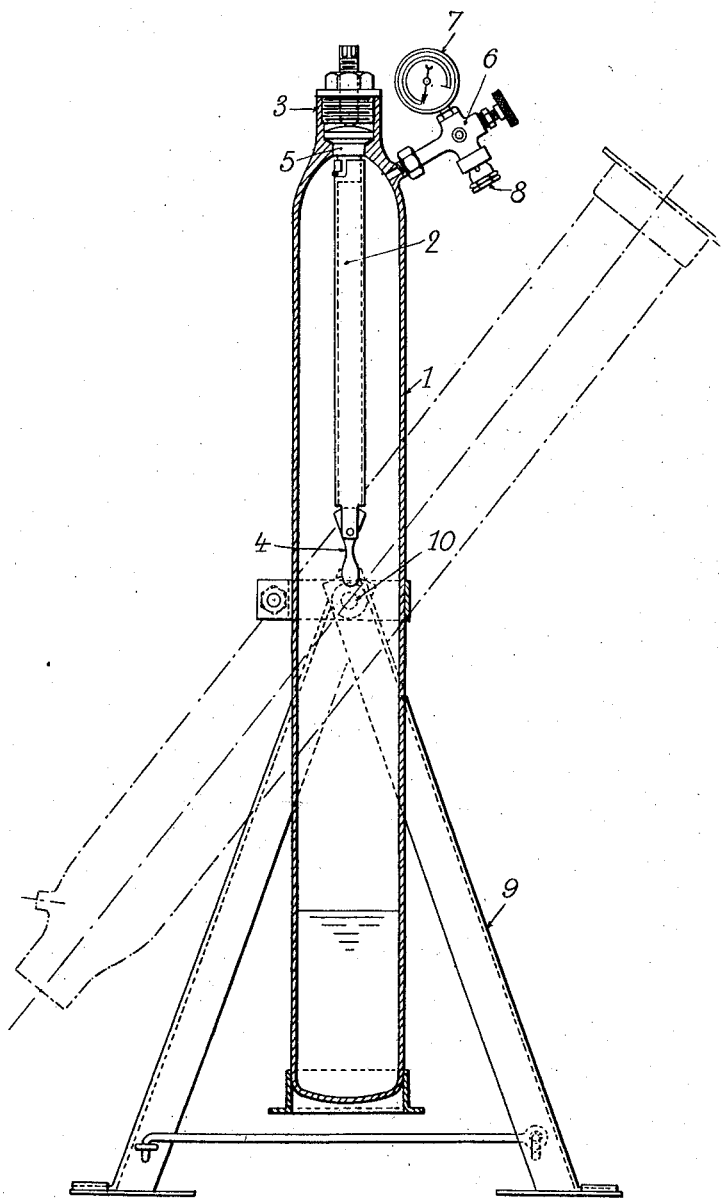
Fig. 1 shows an apparatus comprising a single element.

1 is the body of the generator which is so constructed as to be able to withstand the maximum pressure which is to take place during the operation, this pressure being variable at will, according to the amount of the substances used, and for instance the maximum pressure may be comprised between 1 and 100 or more atmospheres. For instance, the body of the generator may be given the usual shape of compressed gas tubes or bottles.

3 is the inlet orifice provided with a removable closing plug 5 or like closing means. The inlet orifice may be used with advantage as a discharge orifice, the generator being rocked about a horizontal axis 10 upon the support 9.

The ferro-silicon distributer 2 is carried by the plug 5 and consists, for instance, of a tube containing ferro-silicon and the lower end of which is provided with a freely suspended extension 4. The discharge of the gas takes place through a micrometric valve 6; 7 is a pressure gauge and 8 a safety valve.

The operation of the apparatus is as follows:

Soda or potash is introduced through the inlet orifice 3, the required quantity of hot or cold water is added and the apparatus is given a certain number of oscillations, so that the mass be slightly stirred.

The distributer 2 containing pulverized silicon or ferro-silicon is then inserted through the orifice 3 and is secured to the plug 5 and the latter is secured in place.

The upper part of the receptacle may be advantageously covered with a cloth impregnated with water or the said upper part may be provided with a water jacket. A more or less jerked rocking motion is then imparted to the apparatus; the ferro-silicon escapes between the lower end of tube 2 and the extension 4 and is thus progressively distributed while being mixed with the soda or potash solution; the temperature rises at the bottom of the apparatus and the reaction takes place progressively; the motion of the indicating pointer of the pressure gauge 7 will show the speed of production of hydrogen.

After a certain time, which depends namely upon the weight of the mass, the indicating point of the pressure gauge moves no longer forward and even slightly moves backward. The operation is now at an end; water may be sprinkled upon the apparatus, so as to partially cool the same and the valve 6 is opened for discharging hydrogen towards the spot of use.

When all the hydrogen is discharged, the apparatus is rocked through 180° about the axis 10 and may thus be emptied, so that a further operation may take place.

The above method may be used for a small production as well as for a large one. For a small production the apparatus may consist of a suitable tube or bottle for compressed gas.

For a large production use may be made for instance of large tubes of usual size or of a number of such tubes connected to one another in any suitable manner.

Figure 2:
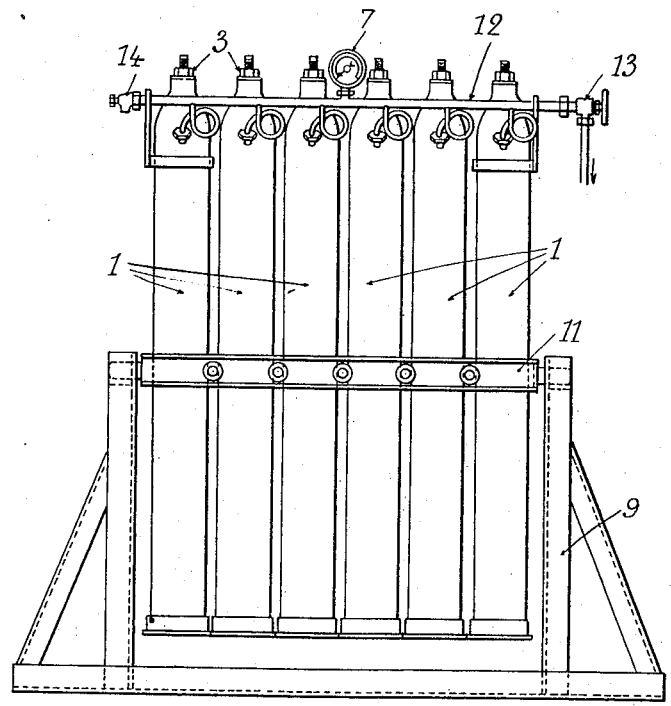
Fig. 2 shows an apparatus formed of several elements as shown in Fig. 1.
Figure 3:
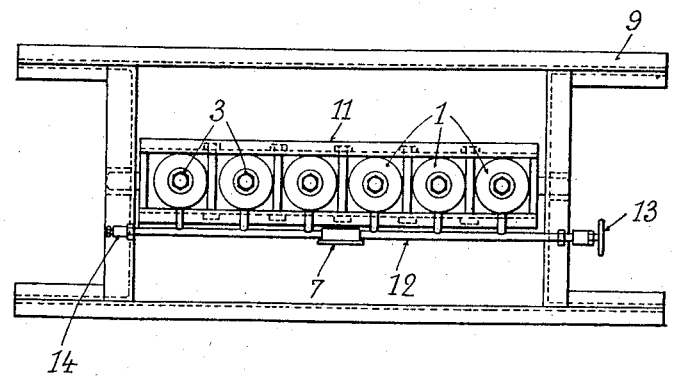
Fig. 3 is a plan view corresponding to Fig. 2.

Figs. 2 and 3 illustrate by way of example a plant comprising several apparatus or generators 1 supported in a frame 11 adapted to oscillate upon a support 9. All the generators are connected to a hydrogen pipe 12 provided with a delivery valve 13 similar to valve 6 of Fig. 1; 7 is the pressure gauge and 14 the safety valve.

Several sets similar to that shown in Figs. 2 and 3 may be suitably connected to one another, so that their rocking motion be balanced.

Having now described my invention, what I claim as new and desire to secure by Letters Patent is:

1. An apparatus for the production of hydrogen which comprises a pivotally supported closed vessel adapted to withstand the pressure of the hydrogen generated therein and to contain a caustic alkali solution, a tube adapted to contain a pulverized silicon compound mounted within said vessel in the upper part thereof, said tube having a number of discharge ports at its lower end and a distributing valve freely suspended at said lower end of the tube and adapted to swing and control said ports when an oscillating motion is imparted to said vessel.

2. An apparatus for the production of hydrogen which comprises a pivotally supported closed vessel adapted to withstand the pressure of the hydrogen generated therein and to contain a caustic alkali solution, a tube adapted to contain a pulverized silicon compound freely suspended from the upper part of said vessel within the latter, said tube having a number of discharge ports at its lower end, and a distributing valve freely suspended at said lower end of the tube and adapted to swing and control said ports when an oscillating motion is imparted to said vessel.

3. An apparatus for the production of hydrogen which comprises a high-pressure gas bottle, means for pivotally supporting said bottle about a horizontal transverse axis thereof, a tube within said bottle and connected with the closing cap thereof, a number of discharge ports at its lower end, and a distributing valve freely suspended at said lower end of the tube and adapted to swing and control said ports when an oscillating motion is imparted to said vessel.

In testimony whereof I have signed my name to this specification.

FERNAND EMILE LEFEBVRE.